United States Patent
Hall et al.

(10) Patent No.: US 7,467,936 B2
(45) Date of Patent: Dec. 23, 2008

(54) RADIAL COMPRESSION ELEMENT FOR A HTHP CARTRIDGE

(76) Inventors: David R. Hall, 2185 S. Larsen Pkwy., Provo, UT (US) 84606; Ronald Crockett, 2185 S. Larsen Pkwy., Provo, UT (US) 84606; Scott Dahigren, 2185 S. Larsen Pkwy., Provo, UT (US) 84606; Timothy C. Duke, 2185 S. Larsen Pkwy., Provo, UT (US) 84606

( * ) Notice: Subject to any disclaimer, the term of this patent is extended or adjusted under 35 U.S.C. 154(b) by 170 days.

(21) Appl. No.: 11/691,906

(22) Filed: Mar. 27, 2007

(65) Prior Publication Data

US 2008/0241293 A1    Oct. 2, 2008

(51) Int. Cl.
B29C 43/04    (2006.01)
B29C 43/32    (2006.01)

(52) U.S. Cl. .................... 425/77; 425/193; 425/330; 425/DIG. 26; 419/48; 419/51

(58) Field of Classification Search ................ 425/77, 425/405.1–405.2, 193, 330, DIG. 26; 419/48, 419/49, 51, 54–55, 68
See application file for complete search history.

(56) References Cited

U.S. PATENT DOCUMENTS

| | | | |
|---|---|---|---|
| 2,918,699 A | 12/1959 | Hall | |
| 2,968,837 A | 1/1961 | Zeitlin et al. | |
| 3,093,862 A | 6/1963 | Gerard et al. | |
| 3,159,876 A | 12/1964 | Hall | |
| 3,182,353 A | 5/1965 | Hall | |
| 3,255,490 A | 6/1966 | Sturm | |
| 3,257,688 A | 6/1966 | Levey, Jr. | |
| 3,914,075 A * | 10/1975 | Kendall | 425/77 |
| 5,744,170 A | 4/1998 | Hall | |
| 5,780,139 A | 7/1998 | Carter | |
| 5,851,568 A | 12/1998 | Huang | |
| 6,022,206 A | 2/2000 | McNutt | |
| 6,186,763 B1 * | 2/2001 | Scanlan | 425/195 |
| 6,336,802 B1 | 1/2002 | Hall | |
| 7,354,262 B2 * | 4/2008 | Hall et al. | 425/77 |
| 2007/0009626 A1 | 1/2007 | Hall et al. | |

* cited by examiner

Primary Examiner—Yogendra Gupta
Assistant Examiner—Thu Khanh T Nguyen
(74) Attorney, Agent, or Firm—Tyson J. Wilde (57) ABSTRACT

A cartridge assembly for connection to a frame of a high temperature, high pressure press, having an anvil at a front end of a cylindrical body of the cartridge and a hydraulic chamber within the body adapted to apply axial pressure to the anvil. A radial compression element is disposed around an outer diameter of the body and is adapted to limit radial expansion of the body proximate the hydraulic chamber.

20 Claims, 8 Drawing Sheets

```
┌─────────────────────────────────────────────┐
│  Provide a cartridge adapted for connection to a  │
│  frame of a high pressure, high temperature press │
│  with an anvil at a front end of the cylindrical body of │
│  the cartridge and a hydraulic chamber within the │
│  body adapted to apply axial pressure to the anvil. │
│                                        1005 │
└─────────────────────────────────────────────┘
                      │
┌─────────────────────────────────────────────┐
│  Compress an outer surface of the body proximate │
│      the hydraulic chamber by fitting a radial    │
│   compression element around the outer surface.   │
│                                        1010 │
└─────────────────────────────────────────────┘
```

Fig. 10

RADIAL COMPRESSION ELEMENT FOR A HTHP CARTRIDGE

BACKGROUND OF THE INVENTION

The current apparatus relates to high temperature, high pressure (HTHP) press apparatuses that are used for a variety of purposes including the production of super hard materials such as synthetic diamond, cubic boron nitride, or diamond like materials. Typically, the manufacturing or sintering process for super hard materials in a HTHP multi-axis press comprise of placing a payload inside a HTHP reaction cell. The reaction cell, made up of a pressure-transferring medium is placed within the press's high-pressure chamber and subjected to an ultra-high compressive force. During the press cycle, the pressure inside the cell must reach 35 kilobars, or more. Simultaneously, an electrical current is passed through the cell's resistance heating mechanism raising the temperature inside the cell to above 1000 degrees C. Once the super hard payload is subjected to sufficient pressure and temperature for a prescribed period of time, the current is terminated and the cell cooled. Pressure on the cell is then released, the anvils retracted, and the cell with its super hard payload removed from the press.

BRIEF SUMMARY OF THE INVENTION

A cartridge assembly for connection to a frame of a high temperature, high pressure press, having an anvil at a front end of a cylindrical body of the cartridge and a hydraulic chamber within the body adapted to apply axial pressure to the anvil. A radial compression element is disposed around an outer diameter of the body and is adapted to limit radial expansion of the body proximate the hydraulic chamber.

The radial compression element may be a solid annular ring. The radial compression element may be a wrap. The wrap may be wound at an angle with respect to a central axis of the assembly. The radial compression element may comprise a varying thickness in an axial direction. The radial compression element may comprise any axial length sufficient to cover the length of the hydraulic cartridge, in some embodiments this may be from 4 to 16 inches. The radial compression element may comprise a thickness from 1 to 5 inches. Preferably, any layer thickness of the radial compression element is 10 to 20 percent of the cylinder diameter. Multiple thinner bands may be used each compressing the band underneath it. Thicker bands may also be used, but it is believed that they are used with diminishing efficiency. The radial compression element may comprise an interference fit around the body of 0.010 to 0.150 inches. The interference may be 0.001 to 0.010 inches per inch of the cylinder diameter per layer. The radial compression element may be made of a material with a hardness from 200 to 700450 HB. The material may be steel chrome and nickel based materials and the alloys thereof, copper alloys cobalt alloys, and composites including Kevlar, glass, quartz, carbon fiber, boron fiber or combinations thereof. The compressive material may be harder or softer than the cylindrical body. The radial compression element may comprise an outer surface with at least one groove. The radial compression element may comprise a chamfered outer surface. The radial compression element may comprise a protrusion adapted for alignment of the assembly within the frame. The assembly may comprise grit between the body and the radial compression element. The assembly may comprise a plurality of radial compression elements disposed around the outer diameter of the body.

A method for use in high temperature, high pressure processing comprises providing a cartridge adapted for connection to a frame of a high temperature, high pressure press with an anvil at a front end of the cylindrical body of the cartridge and a hydraulic chamber within the body adapted to apply axial pressure to the anvil; and compressing an outer diameter of the body proximate the hydraulic chamber by fitting a radial compression element around the outer diameter.

The step of compressing the outer diameter may include thermally expanding the radial compression element and then cooling the element after situating it on the outer surface of the cartridge. In other embodiments the outer diameter may be thermally shrunk and then expanded after the situating it on the outer surface of the cartridge. The step of compressing the outer diameter may include wrapping a material around the cylindrical body.

DETAILED DESCRIPTION OF THE INVENTION AND THE PREFERRED EMBODIMENT

Figure 1:
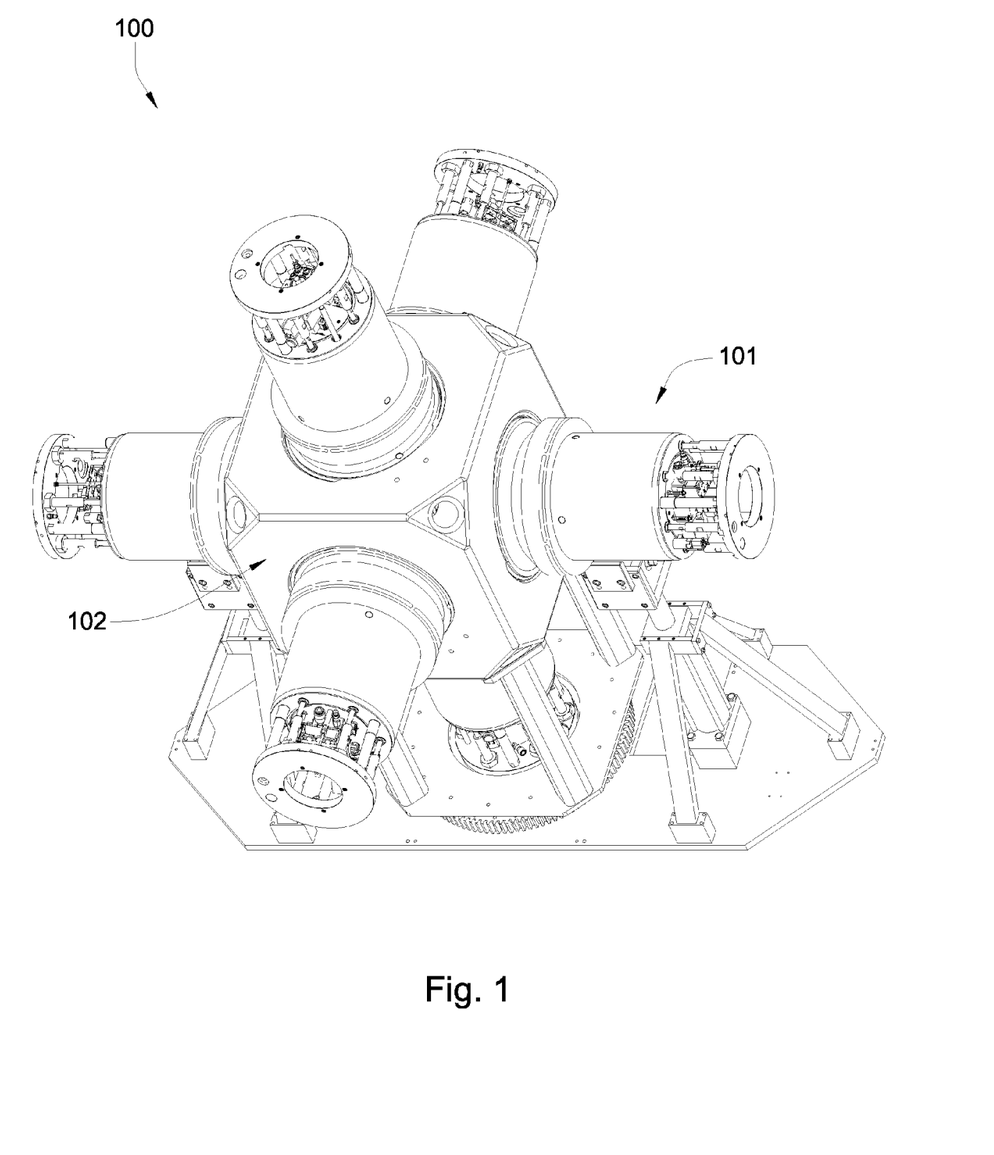
FIG. 1 is a perspective diagram of an embodiment of a high temperature, high pressure press.

Referring to FIG. 1, a preferred embodiment of a high temperature, high pressure (HTHP) press 100 may comprise six cartridge assemblies 101 that are connected to a press frame 102. The cartridge assemblies 101 may converge within a central portion of the press frame 102, forming a pressurized chamber that may be utilized to form super hard materials such as synthetic diamond or cubic boron nitride.

Figure 2:
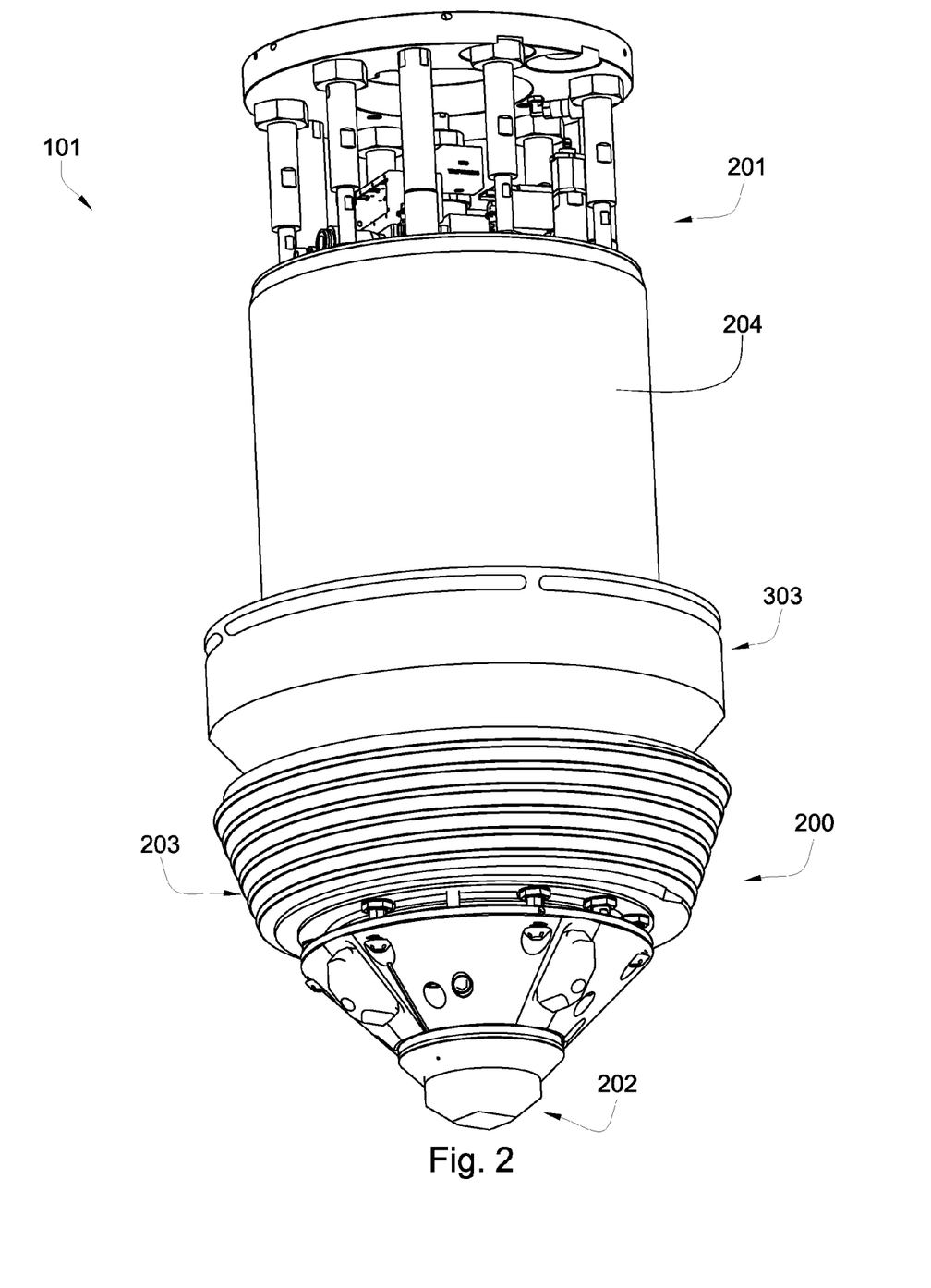
FIG. 2 is a perspective diagram of an embodiment of a cartridge assembly.
Figure 3:
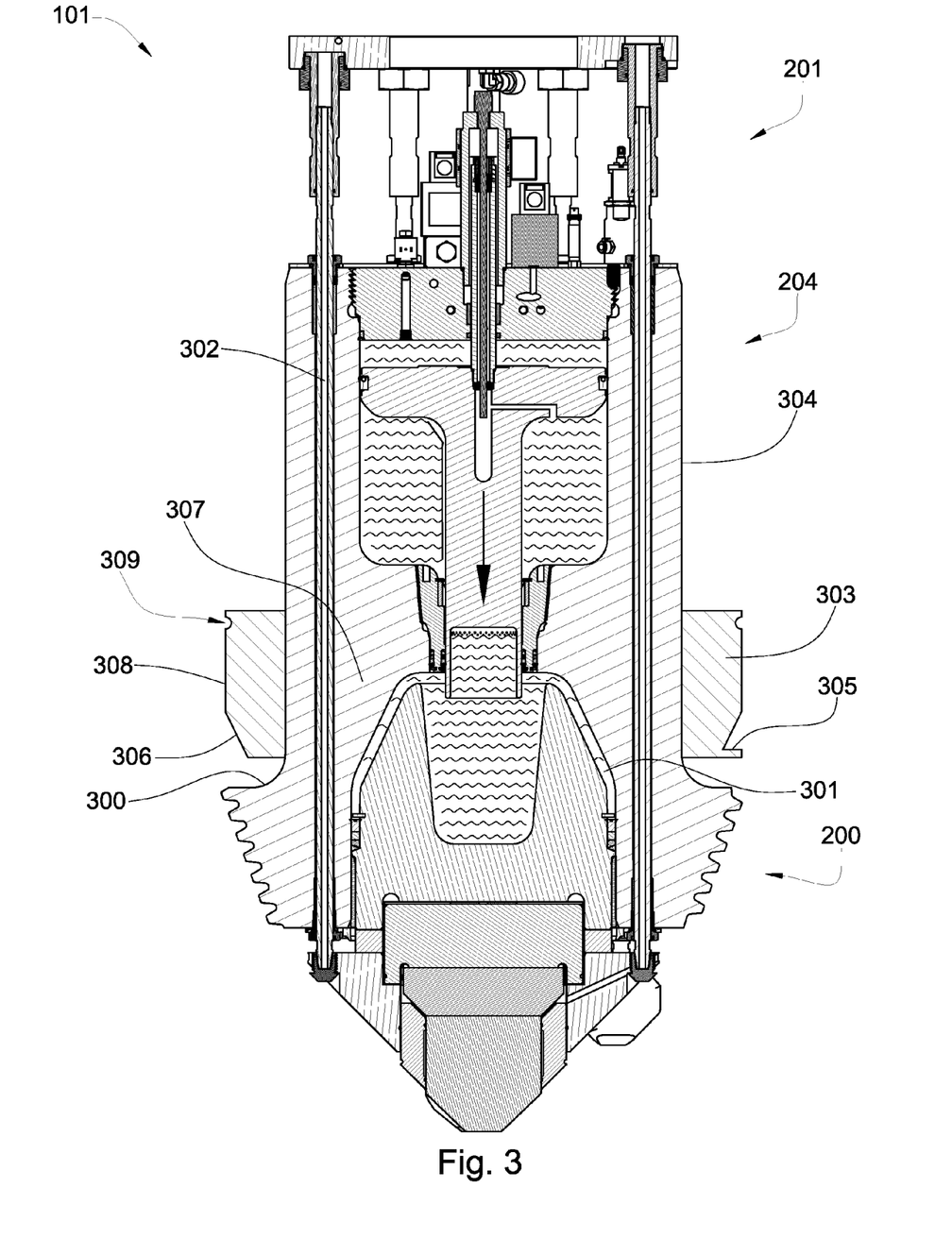
FIG. 3 is a cross-sectional diagram of another embodiment of a cartridge assembly.

The cartridge assembly 101 may comprise a front end 200 and a back end 201, as in the embodiments of FIGS. 2 and 3. The front end 200 may be in communication with the back end 201, such that the back end 201 applies a force on the front end 200, focused at an anvil 202 at the front end 200. The back end 201 may comprise a means of housing hydraulics and electronic circuitry used to produce the required pressures and temperatures for the production of super hard material in the pressurized chamber of the press 100. The assembly 101 may comprise a thread 203 for connecting it to the press frame 102. The thread 203 may be tapered. The assembly 101 may also comprise an undercut portion 300 where the thread 203 begins on the cylindrical body 204, which may allow for structural support near the front end 200 of the assembly 101. U.S. Patent Publication 2007/0040140, which is herein incorporated by reference for all that it discloses, contains a cartridge which may be compatible with the present invention.

A hydraulic chamber 301 may be formed in the cylindrical body 204 of the cartridge assembly 101 proximate the front end 200. While operating, the assembly 101 may subject the hydraulic chamber 301 to high pressures in order to force the front end 200 to extend from the body 204 of the assembly 101. The assembly 101 may comprise a plurality of rods 302 disposed within the body 204 which may help control how far the front end 200 extends. The cartridge assembly 101 may comprise a radial compression element 303 disposed around an outer diameter 304 of the cylindrical body 204 of the assembly adapted to limit radial expansion of the body 204 proximate the hydraulic chamber 301.

The radial compression element 303 may be a solid annular ring. The radial compression element 303 may also comprise a protrusion 305 such as a tab, which may allow either for alignment of the element 303 as it is being fitted around the body 204, or for alignment of the assembly in the press frame 102. The element 303 may comprise an interference fit around the cylindrical body 204 of 0.001 to 0.150 inches. The assembly 101 may comprise grit between the body 204 and the radial compression element 303, which may lock the surfaces of the body 204 and the element 303 together. The grit may comprise diamond or other hard or abrasive materials. In other embodiments, either surface may be textured to increase friction. The radial compression element 303 may comprise a chamfered portion 306, which may control the compressive forces imposed on the cartridge due to the element's varying thickness. The element 303 may also comprise an outer surface 308 with at least one groove 309, which may also aid in aligning the element 303 or the assembly 101.

Figure 4:
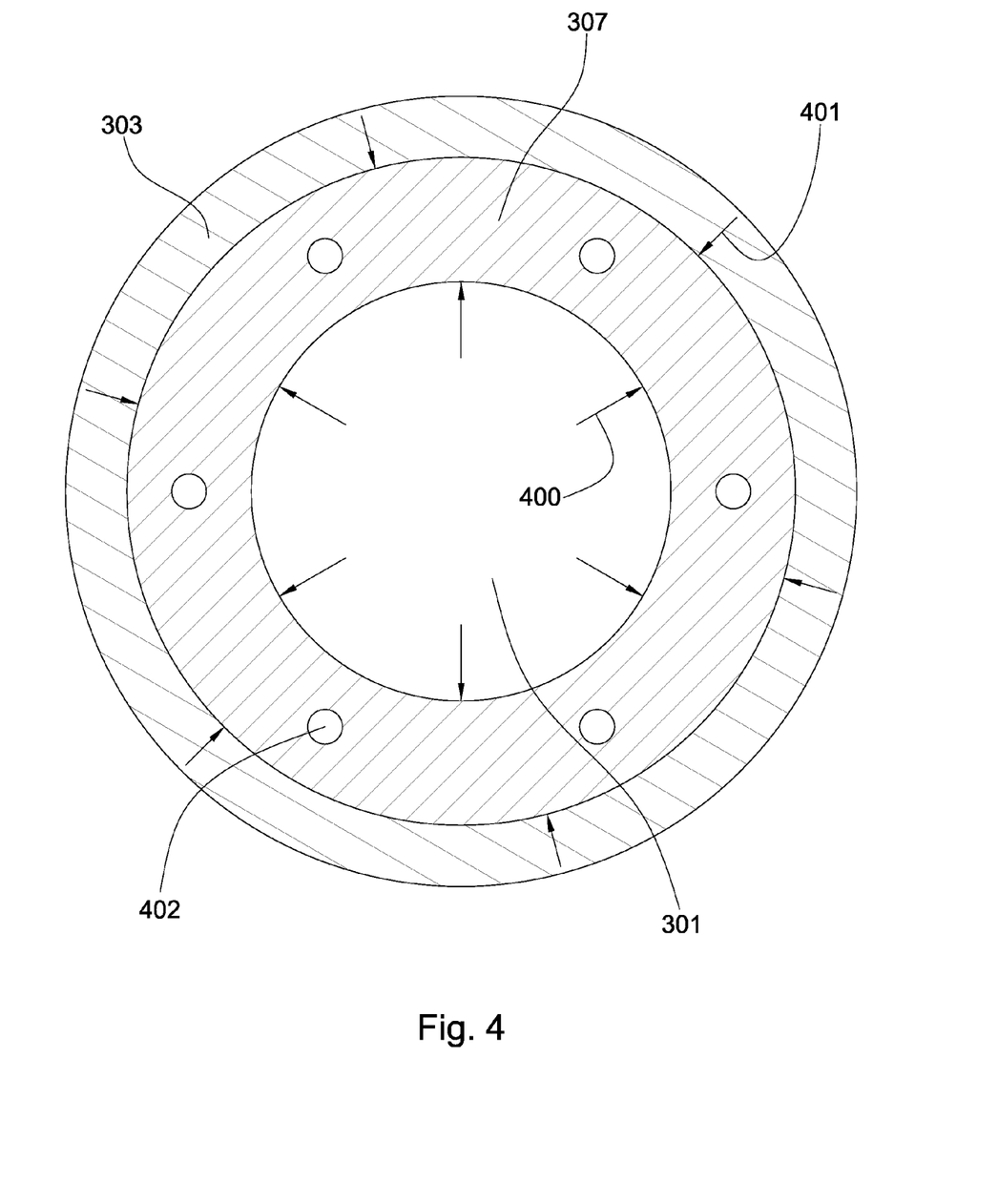
FIG. 4 is a cross-sectional diagram of another embodiment of a cartridge assembly.

As the hydraulics of the assembly 101 are in operation, forces 400, 401 are applied to the outer wall 307 of the chamber 301, as shown in the embodiment of FIG. 4. As the back end 201 is forcing the front end 200 forward, a radial force 400 is applied to the outer wall 307. Later in the cycle, pressure is released from the front end 200, allowing the front end 200 to retract to its original position and the radial force is withdrawn. Applying and releasing such a force on the outer wall 307 repeatedly may cause structural fatigue in the outer wall 307, particularly near areas where the outer wall is thinner. Such thin areas may occur from bores formed in the outer wall that may accommodate equipment such as the rods disclosed in FIG. 4.

Disposing the radial compression element 303 around the body 204 proximate the hydraulic chamber 301 may prevent the structural weaknesses in the outer wall 307. The element 303 applies an inward force 401 to the outer wall, which may counteract some or all of the radial force 400 caused by the high pressure in the hydraulic chamber 301. The element 303 may be made of a softer material than the body 204, such that the element 303 is able to flex due to a large outward force 400. The element 303 may be made of a material with a hardness from 200 to 450 HB—one suitable material may be 4340HT steel or any steel 4000 series.

A cross-section 501 of the radial compression element 303 may comprise different shapes and/or lengths, as in the embodiments of FIGS. 5 through 8. The shape, thickness, material, interference fit, and length of the element may all be critical, due to the varying forces from the varying thickness of the outer wall 307. If the inward force 401 from the element at an edge 500 of the element and the outward force 400 from the outer wall 307 beyond the edge 500 are both large and the radial compression element is too stiff, stress risers may be formed in the outer wall 307 at the edge 500 of the radial compression element.

Figure 5:
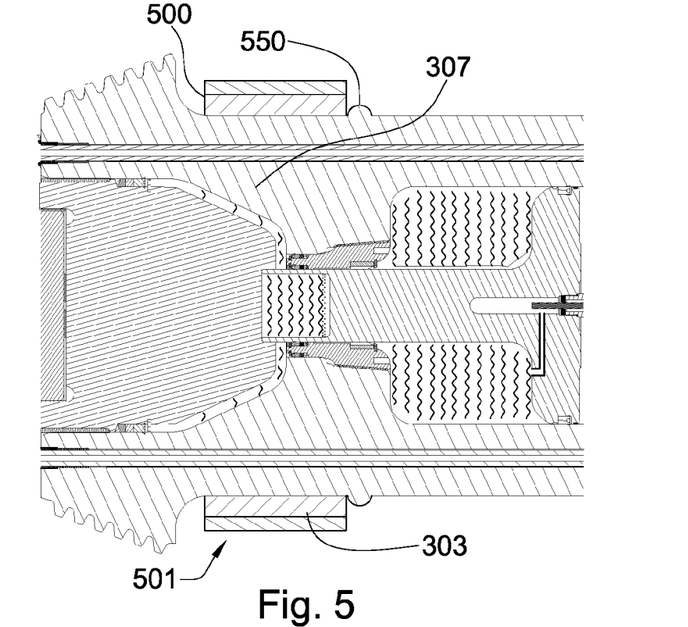
FIG. 5 is a cross-sectional diagram of another embodiment of a cartridge assembly.
Figure 6:
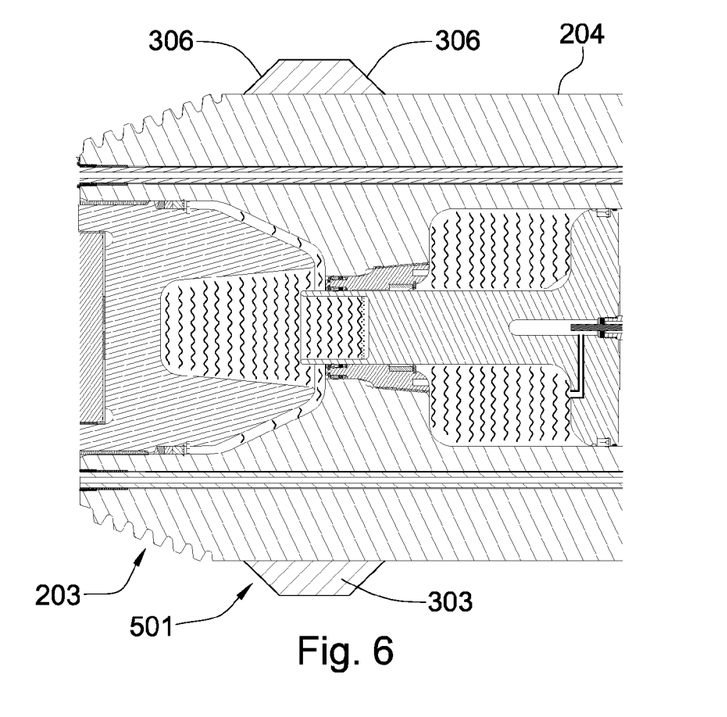
FIG. 6 is a cross-sectional diagram of another embodiment of a cartridge assembly.
Figure 7:
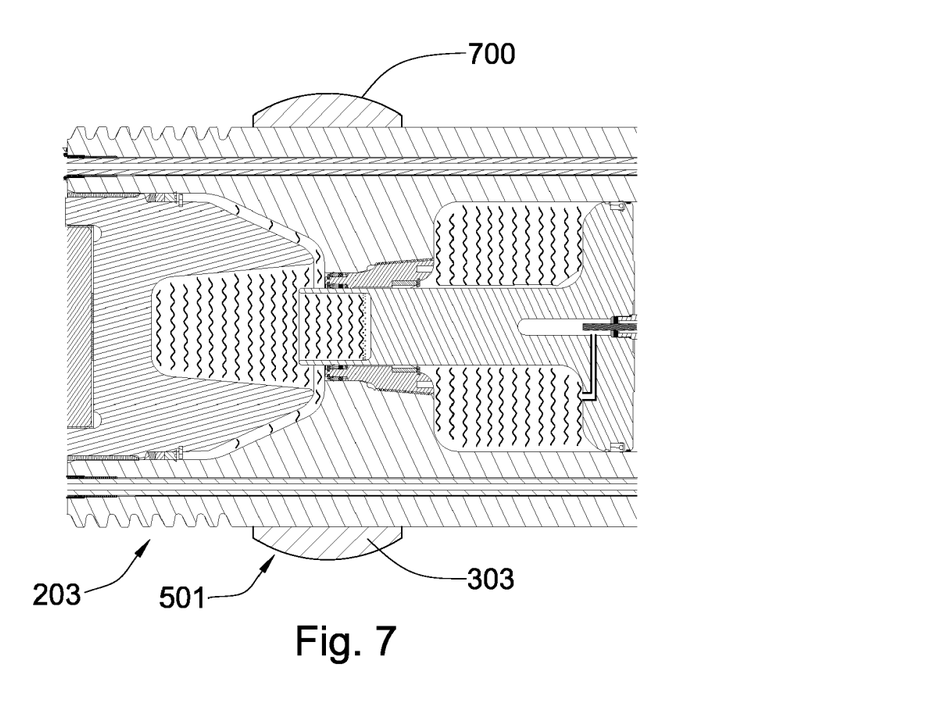
FIG. 7 is a cross-sectional diagram of another embodiment of a cartridge assembly.
Figure 8:
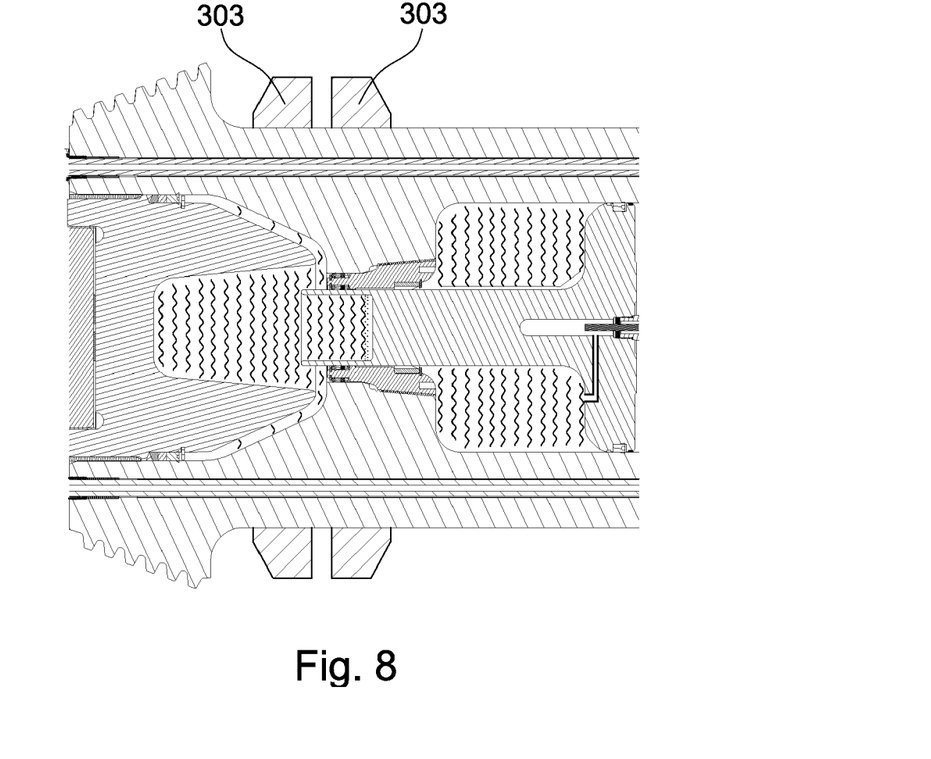
FIG. 8 is a cross-sectional diagram of another embodiment of a cartridge assembly.

The cross-section 501 of the element 303 may be generally rectangular, as in the embodiment of FIG. 5. The radial compression element may also comprise multiple layers of shrink fit bands which may help increase the overall compression of the compression element. Also an axial stop 550, such as a lip formed in the outer wall of the cartridge may prevent the radial compression element from moving incrementally over time. Strain gauges may also be included in or proximate the cartridge to measure the strain felt by the outer wall, the radial compression element, or both. If a dangerous strain threshold is measured by the strain sensors, an automatic decompression protocol may initiate. The cross-section 501 may comprise a plurality of chamfered portions 306, making it generally trapezoidal or otherwise polygonal, as in the embodiment of FIG. 6. The assembly may comprise a transition to a tapered thread 203 without an undercut portion 300, which may require the cylindrical body 204 to comprise a larger diameter. The thread 203 may also be straight, as in the embodiment of FIG. 7. The cross-section 501 of the element 303 may comprise a rounded or elliptical portion 700. The assembly may comprise a plurality of radial compression elements 303, as in the embodiment of FIG. 8.

Figure 9:
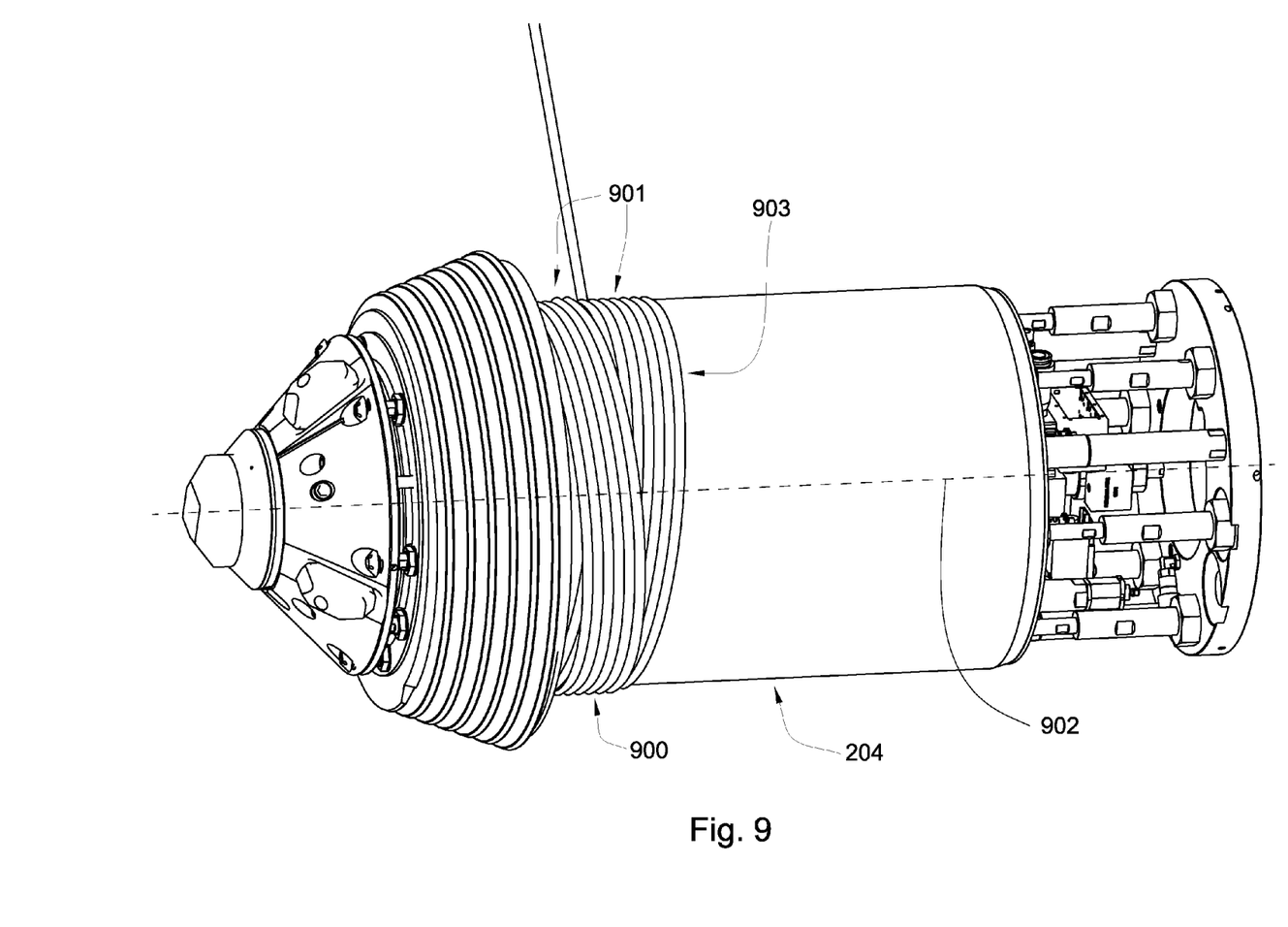
FIG. 9 is a perspective diagram of another embodiment of a cartridge assembly.

The radial compression element may be a wrap 900, such as is shown in the embodiment of FIG. 9. The wrap 900 may be made from a coiled wire, cable, or other material capable of placing the desired amount of compression on the cylindrical body 204. The wrap 900 may comprise a plurality of layers 901. Each layer 901 may be wrapped at a separate angle with respect to a central axis 902 of the cylindrical body 204, though the layers 901 may also all be wrapped at a perpendicular angle with respect to the central axis 902. In this embodiment, the wrap 900 is still in the process of being wrapped around the cylindrical body 204, allowing for an underlying layer 903 to be seen. In other embodiments, the layers may be wrapped in any pattern, including elliptical or helical patterns.

Figure 10:
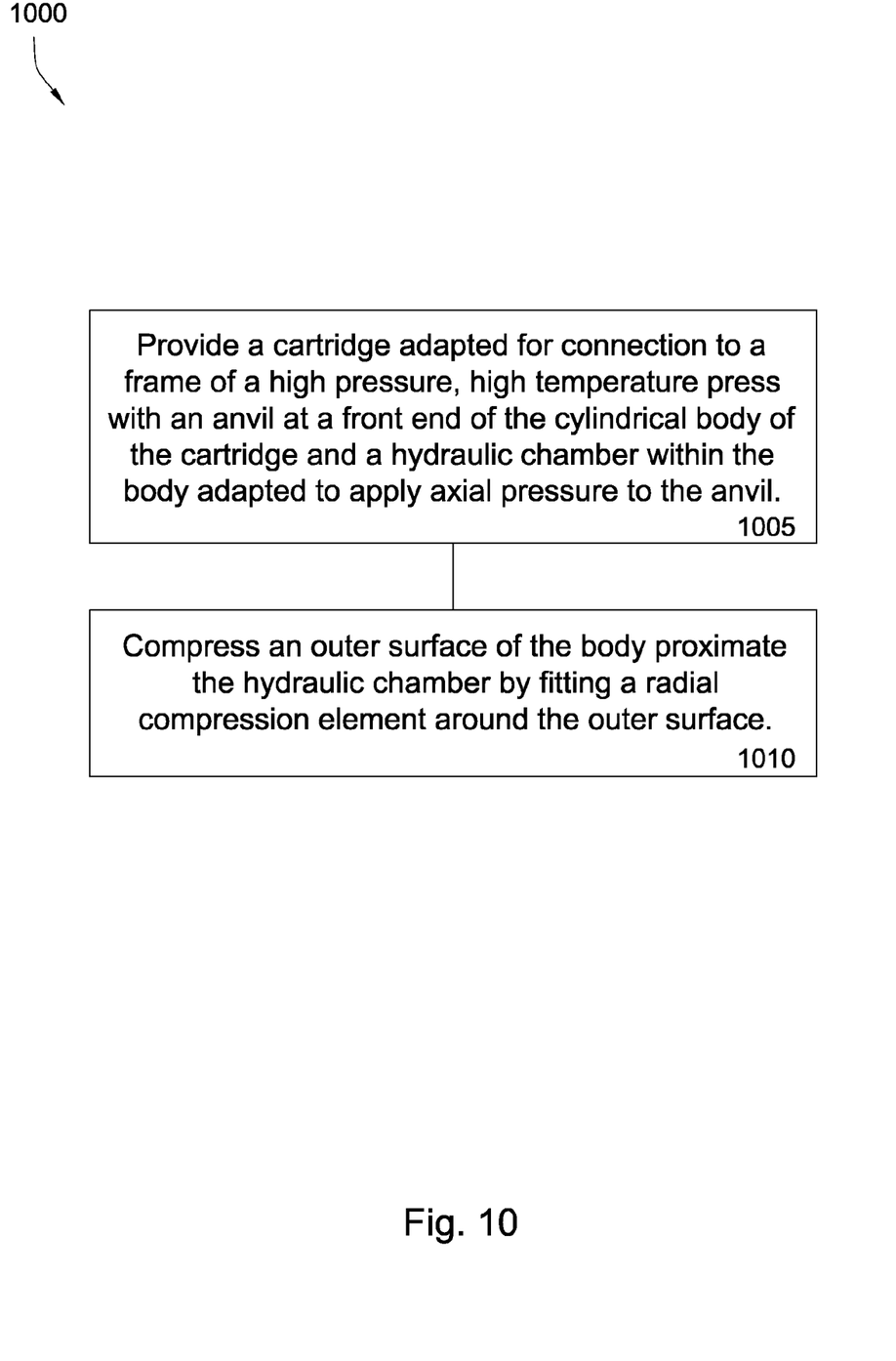
FIG. 10 is flowchart diagram of a method for use in high temperature, high pressure processing.

Referring now to FIG. 10, a method 1000 for use in high temperature, high pressure processing comprises providing 1005 a cartridge adapted for connection to a frame of a high temperature, high pressure press with an anvil at a front end of the cylindrical body of the cartridge and a hydraulic chamber within the body adapted to apply axial pressure to the anvil; and compressing 1010 an outer diameter of the body proximate the hydraulic chamber by fitting a radial compression element around the outer diameter.

The step of compressing the outer diameter may include thermally expanding the radial compression element 303, particularly if the element is an annular ring. The element may be heated to around 600 F in order to expand it such that it may be fitted around the cylindrical body 204. After placing the element around the body, the element may be allowed to cool, allowing it to return to its original size and creating an interference shrink fit between the element and the body.

The step of compressing the outer diameter may also include thermally shrinking the cylindrical body 204 such that the element 303 may then be fitted around the body. One way in which this may be accomplished may be to put a cold material such as dry ice or liquid nitrogen inside the hydraulic chamber before assembling the assembly such that the cold material lowers the temperature of the body, causing the body to shrink. After the element is fitted around the body, the body may be allowed to return to normal temperature, and therefore its original size, creating an interference fit between the element and body. This method may also be used in conjunction with thermally expanding the radial compression element in order to create a higher interference fit. The step of compressing the outer diameter may also include wrapping a material around the cylindrical body, as previously mentioned in the description of FIG. 9. In some embodiments, the radial compression element is press fit over the outer surface of the cylinder.

Whereas the present invention has been described in particular relation to the drawings attached hereto, it should be understood that other and further modifications apart from those shown or suggested herein, may be made within the scope and spirit of the present invention.

What is claimed is:

1. A cartridge assembly for connection to a frame of a high temperature, high pressure press, comprising:
   an anvil at a front end of a cylindrical body of the cartridge and a hydraulic chamber within the body adapted to apply axial pressure to the anvil; and
   a radial compression element disposed around an outer diameter of the body and adapted to limit radial expansion of the body proximate the hydraulic chamber.

2. The assembly of claim 1, wherein the radial compression element is a solid annular ring.

3. The assembly of claim 1, wherein the radial compression element is a wrap.

4. The assembly of claim 3, wherein the wrap is wound at an angle with respect to a central axis of the assembly.

5. The assembly of claim 1, wherein the radial compression element comprises a varying thickness in an axial direction.

6. The assembly of claim 1, wherein the radial compression element comprises an axial length from 4 to 16 inches.

7. The assembly of claim 1, wherein the radial compression element comprises a thickness from 1 to 5 inches.

8. The assembly of claim 1, wherein the radial compression element comprises an interference fit around the body of 0.001 to 0.150 inches.

9. The assembly of claim 1, wherein the radial compression element is made of a material with a hardness from 200 to 450 HB.

10. The assembly of claim 9, wherein the material is steel.

11. The assembly of claim 9, wherein the material is softer than the cylindrical body.

12. The assembly of claim 1, wherein the radial compression element comprises an outer surface with at least one groove.

13. The assembly of claim 1, wherein the radial compression element comprises a chamfered outer surface.

14. The assembly of claim 1, wherein the radial compression element comprises a protrusion adapted for alignment of the assembly within the frame.

15. The assembly of claim 1, wherein the assembly comprises a grit between the body and the radial compression element.

16. The assembly of claim 1, wherein the assembly comprises a plurality of radial compression elements disposed around the outer diameter of the body.

17. A method for use in high temperature, high pressure processing, comprising:
   providing a cartridge adapted for connection to a frame of a high temperature, high pressure press with an anvil at a front end of the cylindrical body of the cartridge and a hydraulic chamber within the body adapted to apply axial pressure to the anvil; and
   compressing an outer diameter of the body proximate the hydraulic chamber by fitting a radial compression element around the outer diameter.

18. The method of claim 17, wherein the step of compressing the outer diameter includes thermally expanding the radial compression element.

19. The method of claim 17, wherein the step of compressing the outer diameter includes thermally shrinking the cylindrical body.

20. The method of claim 17, wherein the step of compressing the outer diameter includes wrapping a material around the cylindrical body.

* * * * *